United States Patent
Duong et al.

(10) Patent No.: US 11,027,885 B2
(45) Date of Patent: Jun. 8, 2021

(54) CONTAINER WITH ONE OR MORE TRAY RETENTION PORTIONS AND SUPPORT STAND

(71) Applicant: Igloo Products Corp., Katy, TX (US)

(72) Inventors: Quang Lee Duong, Katy, TX (US); Herman Sebastian Cousin Espinosa, Katy, TX (US)

(73) Assignee: IGLOO PRODUCTS CORP., Katy, TX (US)

( * ) Notice: Subject to any disclaimer, the term of this patent is extended or adjusted under 35 U.S.C. 154(b) by 0 days.

(21) Appl. No.: 16/545,209

(22) Filed: Aug. 20, 2019

(65) Prior Publication Data

US 2020/0062454 A1    Feb. 27, 2020

Related U.S. Application Data

(60) Provisional application No. 62/720,466, filed on Aug. 21, 2018.

(51) Int. Cl.
| | |
|---|---|
| *B65D 25/20* | (2006.01) |
| *B65D 25/28* | (2006.01) |
| *B65D 81/38* | (2006.01) |
| *A47B 5/04* | (2006.01) |

(52) U.S. Cl.
CPC .............. *B65D 25/20* (2013.01); *A47B 5/04* (2013.01); *B65D 25/2841* (2013.01); *B65D 81/3813* (2013.01)

(58) Field of Classification Search
CPC ........ B65D 25/20; B65D 25/22; B65D 25/28; B65D 25/2835; B65D 25/2838; B65D 25/2841; B65D 25/2844; B65D 81/3825; A47B 5/00; A47B 5/04
See application file for complete search history.

(56) References Cited

U.S. PATENT DOCUMENTS

| | | | |
|---|---|---|---|
| 1,455,395 A | 5/1923 | Exum | |
| 3,979,007 A * | 9/1976 | Thornbloom, Jr. | .... A45C 11/20 220/522 |
| 4,400,951 A * | 8/1983 | Cherry | .................. A47B 83/04 108/50.13 |

(Continued)

OTHER PUBLICATIONS

International Search Report and Written Opinion issued in PCT/US2019/047151, dated Oct. 21, 2019, 14 pages.

*Primary Examiner* — Daniel J Rohrhoff
(74) *Attorney, Agent, or Firm* — King & Spalding LLP

(57) ABSTRACT

Containers with one or more tray retention portions and a support stand are described. For example, a container can include: a substantially hollow body including a plurality of body walls extending vertically from a bottom portion; an extension portion rotatably coupled to an outward-facing surface of a body wall among the plurality of body walls, the extension portion configured to rotate to an active position in which the extension portion extends outwardly from the body wall; and a support stand having a proximal end coupled to the outward-facing surface of the body wall and a distal end, the support stand configured to move between at least a stowed position in which the support stand is positioned against or proximate to the outward-facing surface of the body wall and a support position in which the support stand extends outwardly from the body wall.

15 Claims, 10 Drawing Sheets

(56) References Cited

U.S. PATENT DOCUMENTS

| | | | | |
|---|---|---|---|---|
| 5,306,029 A * | 4/1994 | Kaiser, II | | A47B 31/02 |
| | | | | 108/80 |
| 5,431,298 A * | 7/1995 | Ahn | | A45C 9/00 |
| | | | | 220/756 |
| 5,480,170 A * | 1/1996 | Kaiser, II | | A47B 31/02 |
| | | | | 108/80 |
| 5,551,558 A * | 9/1996 | Bureau | | A45C 9/00 |
| | | | | 190/11 |
| 5,660,296 A | 8/1997 | Greenwich | | |
| 5,803,472 A * | 9/1998 | Lien | | A45C 5/14 |
| | | | | 108/129 |
| 5,947,032 A * | 9/1999 | Meier | | A47B 5/06 |
| | | | | 108/33 |
| 6,176,499 B1 * | 1/2001 | Conrado | | A45C 5/14 |
| | | | | 280/47.26 |
| 6,792,935 B2 * | 9/2004 | Williams | | A47J 37/0763 |
| | | | | 126/25 R |
| 7,451,709 B2 * | 11/2008 | Swartfager | | F25D 23/12 |
| | | | | 108/14 |
| 7,854,321 B2 | 12/2010 | Twig et al. | | |
| 9,480,324 B2 * | 11/2016 | Angelozzi | | A47B 3/10 |
| 2008/0179847 A1 * | 7/2008 | DeFrancia | | B62B 1/26 |
| | | | | 280/47.26 |
| 2010/0000893 A1 * | 1/2010 | Twig | | B25H 3/023 |
| | | | | 206/373 |
| 2012/0292213 A1 * | 11/2012 | Brunner | | B25H 3/028 |
| | | | | 206/349 |
| 2015/0375917 A1 * | 12/2015 | Lee | | B65D 25/28 |
| | | | | 220/592.03 |
| 2016/0166070 A1 * | 6/2016 | Golic | | A47C 9/10 |
| | | | | 206/216 |
| 2017/0115045 A1 | 4/2017 | Aiken | | |
| 2017/0129097 A1 | 5/2017 | Engvall et al. | | |
| 2018/0015938 A1 * | 1/2018 | DeFrancia | | B62B 5/067 |

* cited by examiner

CONTAINER WITH ONE OR MORE TRAY RETENTION PORTIONS AND SUPPORT STAND

RELATED APPLICATIONS

The present application is a non-provisional application of and claims priority under 35 U.S.C. § 119 to U.S. Provisional Application No. 62/720,466, entitled "Container With One Or More Tray Retention Portions And Support Stand" and filed on Aug. 21, 2018, the entirety of which is incorporated by reference herein.

TECHNICAL FIELD

The present disclosure relates generally to containers, and more particularly, to a container with one or more tray retention portions and a support stand.

BACKGROUND

Containers, such as coolers, ice chests, and the like, are often used for picnics because of their ability to portably store food and beverages. During many picnics, a common inconvenience arises in which a lack of counter-space limits one's ability to prepare or serve meals. Users often resolve this issue by bringing trays on which to prepare meals, store utensils, serve food and drinks, and so forth.

However, conventional containers lack the capability for securely retaining these trays while in use. Users resort to, for instance, placing the tray atop the container without means for securing the tray in place, laying the tray on the ground, or even holding the tray on their lap. Furthermore, conventional containers lack the capability for securely storing the trays while not in use, e.g., during transportation of the container.

SUMMARY

The present disclosure provides a container which can include one or more tray retention portions, such as an internal tray retention portion and an external tray retention portion. The internal tray retention portion can be formed in a lid of the container, and can include at least a first rail and a second rail respectively formed in an underside of the lid so as to receive and retain the tray therein. The external tray retention portion can be formed in an upper surface of an extension portion, such as a handle, rotatably coupled to an outward-facing surface of one of the container walls. The container can further include a support stand coupled to the outward-facing surface of one of the container walls. When in use, the support stand can provide support for the extension portion by preventing downward rotation of the extension portion.

In accordance with embodiments of the present disclosure, a container can include: a substantially hollow body including a plurality of body walls extending vertically from a bottom portion; an extension portion rotatably coupled to an outward-facing surface of a body wall among the plurality of body walls, the extension portion configured to rotate to an active position in which the extension portion extends outwardly from the body wall; and a support stand having a proximal end coupled to the outward-facing surface of the body wall and a distal end, the support stand configured to move between at least a stowed position in which the support stand is positioned against or proximate to the outward-facing surface of the body wall and a support position in which the support stand extends outwardly from the body wall. When the support stand is in the support position, the distal end of the support stand can engage with an underside of the extension portion such that the support stand prevents downward rotation of the extension portion.

The extension portion can be further configured to rotate between at least the active position and an inactive position in which the extension portion is positioned against or proximate to the outward-facing surface of the body wall.

When the support stand is in the support position, such that the distal end of the support stand engages with the underside of the extension portion, an angle formed between the extension portion and the body wall can be approximately equal to 90 degrees, and an angle formed between the support stand and the body wall can be less than 90 degrees.

The extension portion can be a handle including a pair of outwardly extending arms connected via a transversely extending crossbar. In this regard, upper surfaces of the arms and crossbar can form an external tray retention portion configured to removably retain a tray having a substantially flat, elongate surface. When the support stand is in the support position and the external tray retention portion retains the tray, the support stand can provide support for the tray and the extension portion. Also, the external tray retention portion can mate with an underside of the tray so as to prevent lateral movement of the tray.

When the support stand is in the support position, the support stand can provide support for the extension portion such that a downward force applied to the extension portion is transferred through the support stand to the body wall.

The proximal end of the support stand can be rotatably coupled to the body wall, and the support stand can be configured to rotate between at least the stowed position and the support position.

The container can further include an indentation portion formed on the underside of the extension portion, the indentation portion configured to mate with the distal end of the support stand when the support stand is in the support position.

The distal end of the support stand can include a transversely extending crossbar configured to engage with the underside of the extension portion.

When the support stand is in the stowed position, the support stand and the extension portion can be unattached to each other.

The distal end of the support stand can be bolted to the underside of the extension portion.

The support stand can include a hinging portion configured to fully hinge when the support stand is in the stowed position and fully extend when the support stand is in the support position.

When the support stand is in the stowed position and the extension portion is in an inactive position in which the extension portion is positioned against or proximate to the surface of the body wall, the extension portion can at least partially conceal the support stand.

The extension portion can be a tray having a substantially flat, elongate surface.

Furthermore, in accordance with embodiments of the present disclosure, a container can include: a substantially hollow body including a plurality of body walls extending vertically from a bottom portion; a lid rotatably coupled to, or removable from, an upper portion of a body wall among the plurality of body walls, the lid configured to reversibly close an opening of the body formed by the plurality of body walls; and an internal tray retention portion formed in an underside of the lid configured to removably retain a tray having a substantially flat, elongate surface, the internal tray retention portion including at least a first rail and a second rail respectively formed on opposite sides of a peripheral region of the underside of the lid, the first rail and the second rail formed so as to receive and retain the tray therein.

The internal tray retention portion can further include a third rail formed on the peripheral region of the underside of the lid perpendicular to the first rail and the second rail.

The internal tray retention portion can further include an elongate protrusion portion formed inside of the peripheral region of the underside of the lid perpendicular to the first rail and the second rail and parallel to the third rail.

A shape formed by the first rail, the second rail, the third rail, and the protrusion portion can substantially correspond to a shape of the tray.

The first rail and the second rail are connected via the third rail. Alternatively, the first rail, the second rail, and the third rail can be physically separate from each other.

Furthermore, in accordance with embodiments of the present disclosure, a container system can include: a substantially hollow body including a plurality of body walls extending vertically from a bottom portion; a removable tray having a substantially flat, elongate surface; a lid rotatably coupled to, or removable from, an upper portion of the plurality of body walls, the lid configured to reversibly close an opening of the body formed by the plurality of body walls; a handle rotatably coupled to an outward-facing surface of a body wall among the plurality of body walls, the handle configured to rotate to an active position in which the handle extends outwardly from the body wall; a support stand having a proximal end coupled to the outward-facing surface of the body wall and a distal end, the support stand configured to move between at least a stowed position in which the support stand is positioned against or proximate to the outward-facing surface of the body wall and a support position in which the support stand extends outwardly from the body wall and engages with an underside of the handle; an internal tray retention portion formed in an underside of the lid configured to removably retain the tray; and an external tray retention portion formed in an upper surface of the handle configured to removably retain the tray. When the support stand is in the support position and the external tray retention portion retains the tray, the support stand can provide support for the tray and the handle such that the support stand prevents downward rotation of the handle.

BRIEF DESCRIPTION OF THE DRAWINGS

The embodiments herein may be better understood by referring to the following description in conjunction with the accompanying drawings in which like reference numerals indicate identically or functionally similar elements, of which.

Figure 1A:
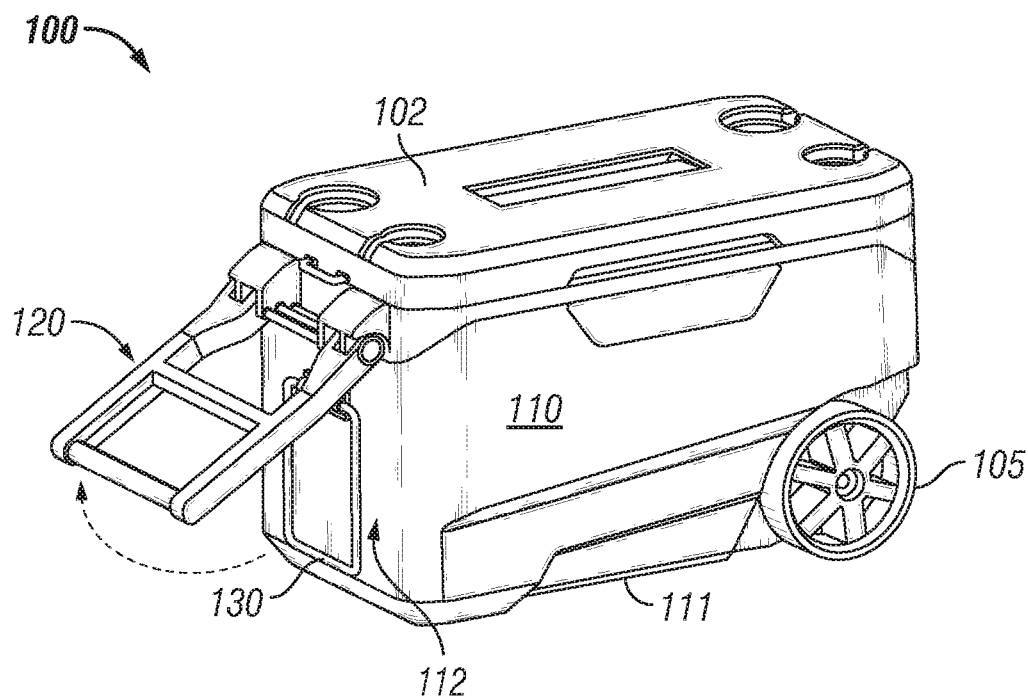
FIGS. 1A-1C include views of a container with a rotatable extension portion.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Referring now to embodiments of the present disclosure, the disclosed container, such as a cooler, an ice chest, or the like, can include one or more tray retention portions for securely receiving and retaining a removable tray having a having a substantially flat, elongate surface. The one or more tray retention portions can include, for instance, an internal tray retention portion and/or an external tray retention portion. The container can include a support stand coupled to a container wall for, among other things, supporting a weight of the external tray retention portion. As a result, a user can securely and conveniently utilize and store a tray to assist in preparing meals, storing utensils, serving food or drinks, and the like.

Figure 1B:
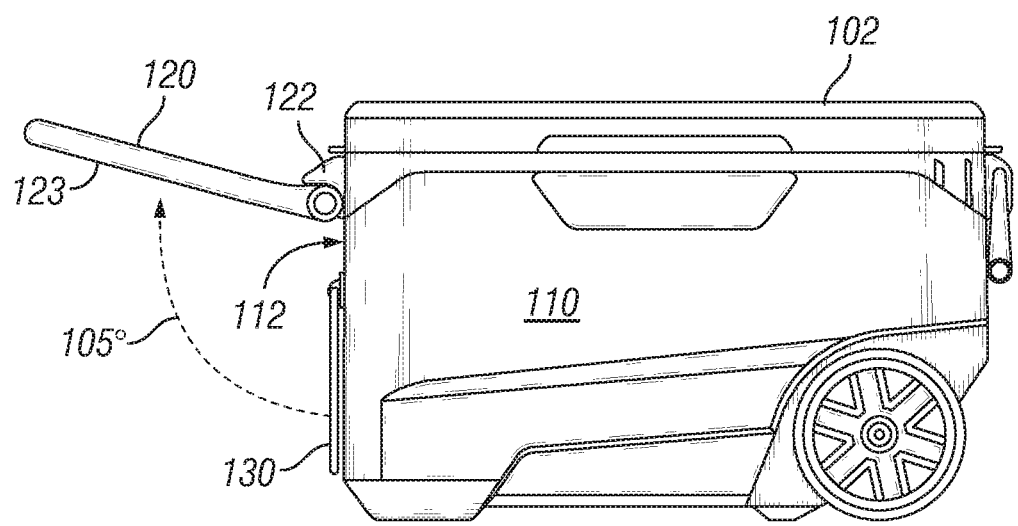
Figure 1C:
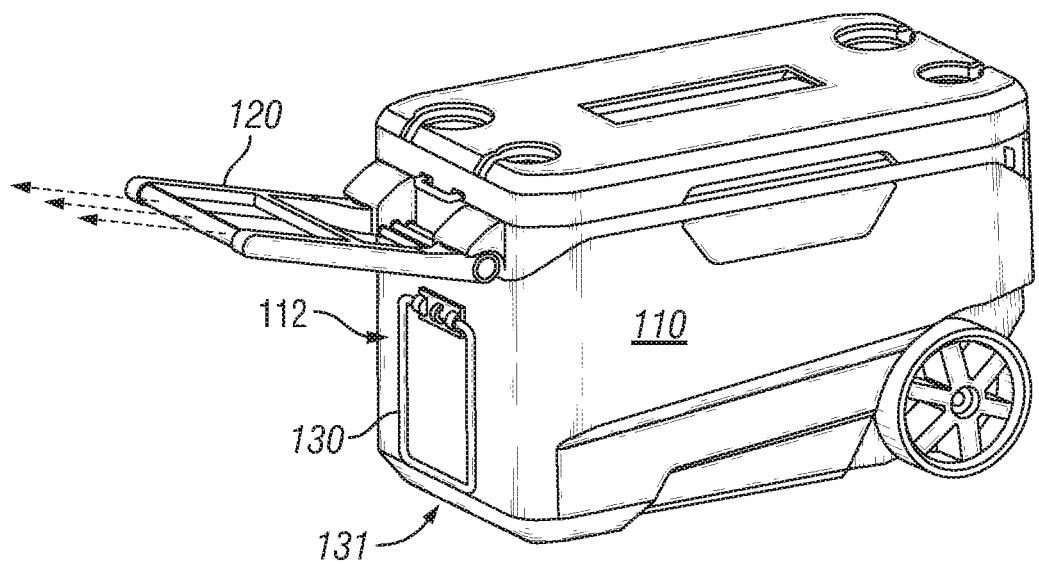

FIGS. 1A-1C include views of a container 100 with a rotatable extension portion 120. As shown in FIGS. 1A-1C, the container 100 can include a substantially hollow body 110 including a plurality of body walls 112 extending vertically from a bottom portion 111. The container 100 can further include a lid 102 rotatably coupled to an upper portion of the body walls 112. The lid 102 can be connected to the body walls 112, via a rotating connection means such as one or more pins, hinges, joints, pivots, etc., and can rotate to reversibly close an opening 615 (FIG. 6) of the body 110 formed by the plurality of body walls 112 and the bottom portion 111.

The container 100 can further include an extension portion 120 rotatably coupled to an outward-facing surface of a body wall 112. While the extension portion 120 is shown in FIGS. 1A-1C as coupled to a particular body wall 112, the extension portion 120 can be coupled to any of the body walls 112 of the body 110.

Figure 3A:
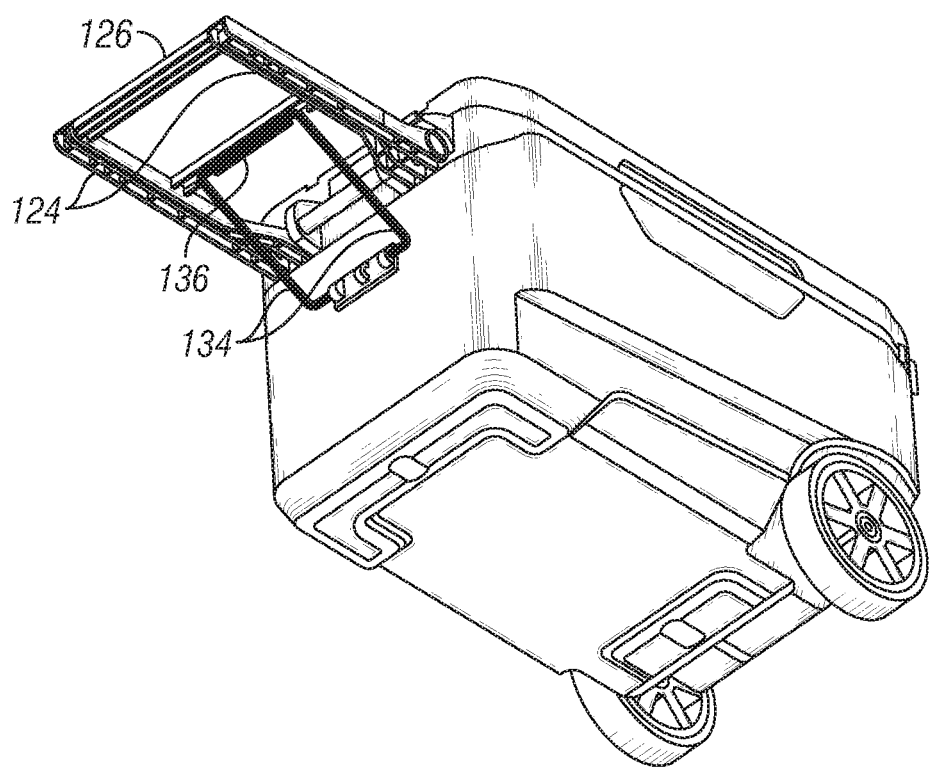
FIGS. 3A and 3B include views of the container of FIG. 1 with the support stand engaging with the extension portion.

The extension portion 120 can be, for example, a handle, as shown in FIGS. 1A-1C, allowing a user to conveniently pull or push the container 100. To this end, the container 100 can include one or more wheels 105 to allow the container body 110 to roll while being pulled or pushed via the extension portion 120. The extension portion 120, or handle, can include, for example, a pair of outwardly extending arms 124 (FIG. 3A) connected via a distal, transversely extending crossbar 126 (FIG. 3A) (e.g., for gripping the handle), as shown in FIG. 3A. The handle 120 can also include additional transversely extending crossbars disposed proximal of the distal crossbar 126. Moreover, as described in greater detail below (e.g., see FIGS. 5A and 5B), the upper surfaces of the arms 124 and crossbar 126 can form an external tray retention portion 200 configured to removably retain a tray 140 having a substantially flat, elongate surface.

The extension portion 120 can be connected to the body wall 112, via a rotating connection such as one or more pins, hinges, joints, pivots, etc., and can rotate between, at least, an inactive position 621 (FIG. 6) in which the extension portion 120 is positioned against or proximate to the outward-facing surface of the body wall 112 and an active position 123 in which the extension portion 120 extends outwardly from the body wall 112. In the inactive position 621 (FIG. 6), whereby the extension portion 120 is stowed away, an angle formed between the extension portion 120 and the body wall 112 can be approximately 0 degrees, that is, parallel to the body wall 112. In the active position 123, whereby the extension portion 120 rotates upwardly from the body wall 112 for use, the angle formed between the extension portion 120 and the body wall 112 can be any angle greater than 0 degrees. The active position 123 can allow a user to engage with the extension portion 120 (e.g., to pull the container 120 as shown in FIG. 1C).

The container 100 can include a hard stop 122 preventing upward rotation of the extension portion 120 beyond a certain point. For example, as shown in FIG. 1B, the hard stop 122 can prevent the extension portion 120 from rotating beyond 105 degrees with respect to the body wall 112. However, it is understood that the example shown in FIG. 1B is provided for demonstration purposes only, and that the container 100 can be modified such that the hard stop 122 allows rotation of the extension portion 120 beyond 105 degrees (e.g., 110 degrees, etc.), or less than 105 degrees (e.g., 100 degrees, etc.).

The container 100 can further include a support stand 130 disposed on the body wall 112 below the extension portion 120. The support stand 130 can connect to body wall 112 so as to swing upwardly or downwardly into a desired position. According to certain exemplary embodiments, the support stand 130 and the extension portion 120 are coupled to the same body wall 112.

Figure 2A:
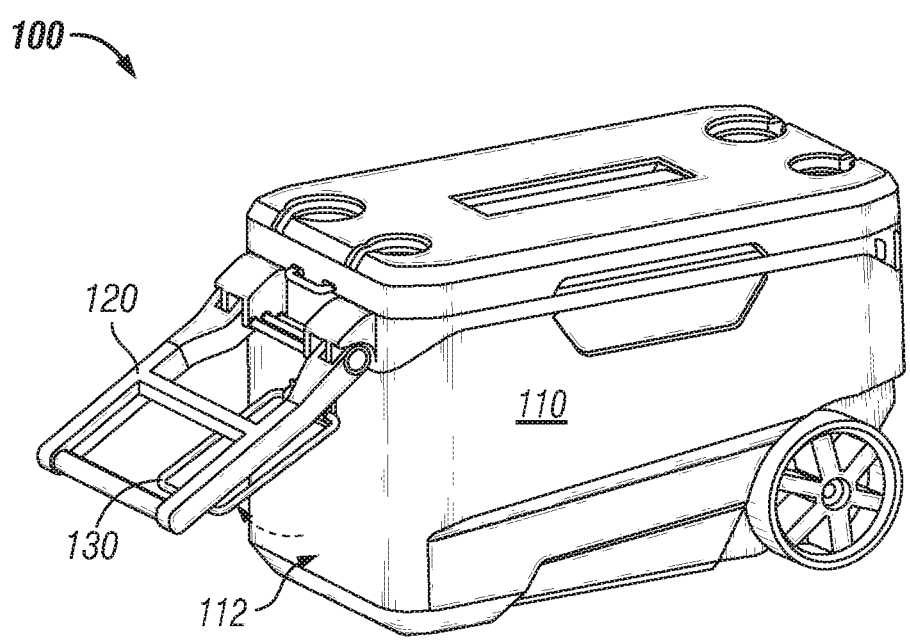
FIGS. 2A and 2B include views of the container of FIG. 1 with a rotatable support stand.
Figure 2B:
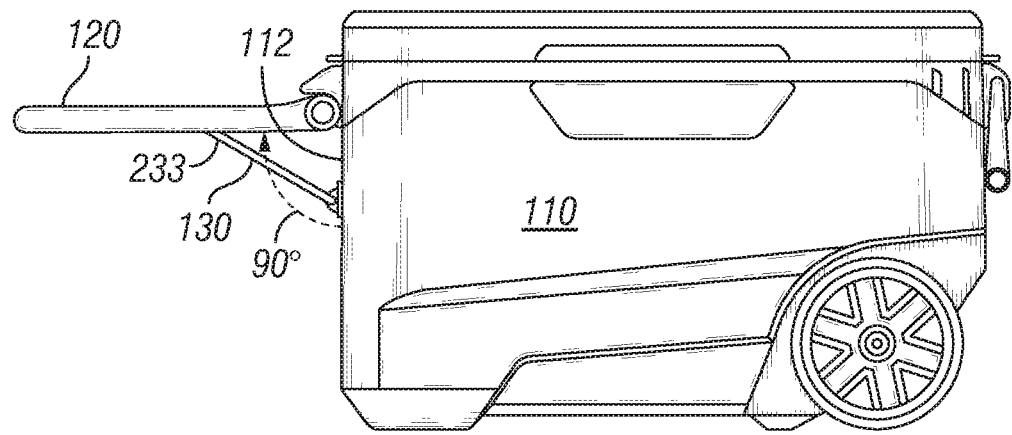

To illustrate, FIGS. 2A and 2B include views of the container 100 with a rotatable support stand 130. As shown in FIGS. 2A and 2B, a proximal end of the support stand 130 can be coupled to the outward-facing surface of the body wall 112. The proximal end of the support stand 130 can be connected to the body wall 112, via a rotating connection such as one or more pins, hinges, joints, pivots, etc., and can permit the support stand 130 to rotate between, at least, a stowed position 131 in which the support stand 130 is positioned against or proximate to the outward-facing surface of the body wall 112 and a support position 233 in which the support stand 130 extends outwardly from the body wall 112.

When the support stand 130 is not in use, it can be moved to the stowed position 131, as shown in FIGS. 1A-1C, whereby the support stand 130 can be positioned against or proximate to the outward-facing surface of the body wall 112. Here, the support stand 130 can be placed substantially flat against the body wall 112. Similarly, the extension portion 120 can be positioned against or proximate to the outward-facing surface of the body wall 112 when not in use (i.e., inactive position 621 (FIG. 6)).

Figure 6:
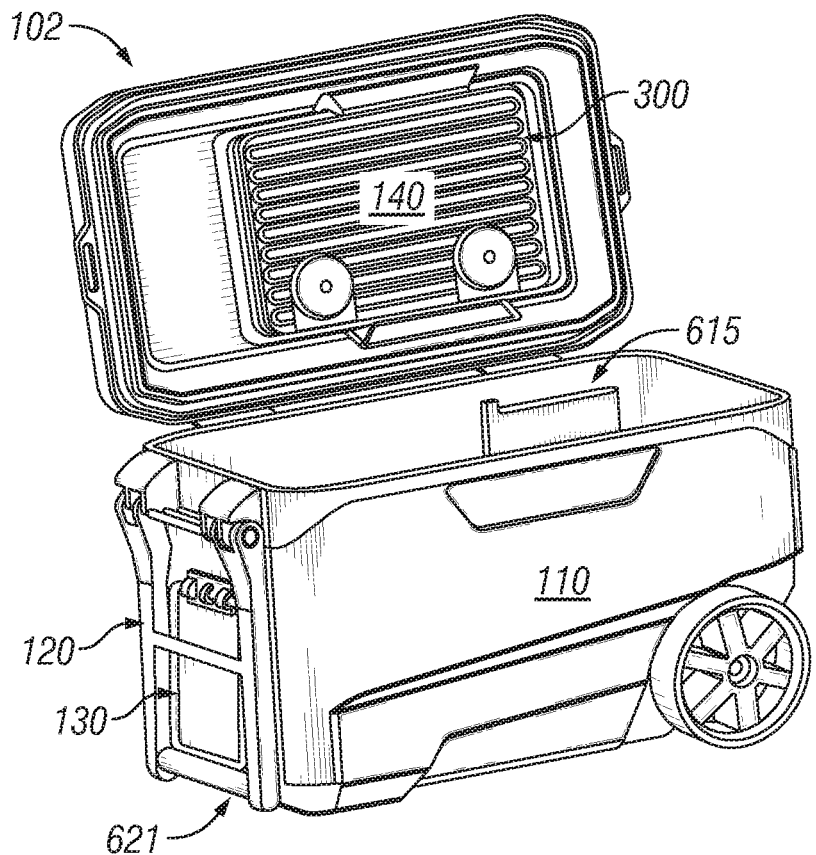
FIG. 6 is a perspective view of the container of FIG. 1 with an internal tray retention portion formed in an underside of a lid.

When both of the extension portion 120 and the support stand 130 are stowed against the body wall 112, the extension portion 120 and the support stand 130 can be substantially parallel to one another, as shown in FIG. 6. Also, in such positions, the extension portion 120 can at least partially conceal the support stand 130, as shown in FIG. 6, by virtue of the extension portion 120 being disposed above the support stand 130, though the extension portion 120 need not necessarily conceal the support stand 130.

Figure 10A:
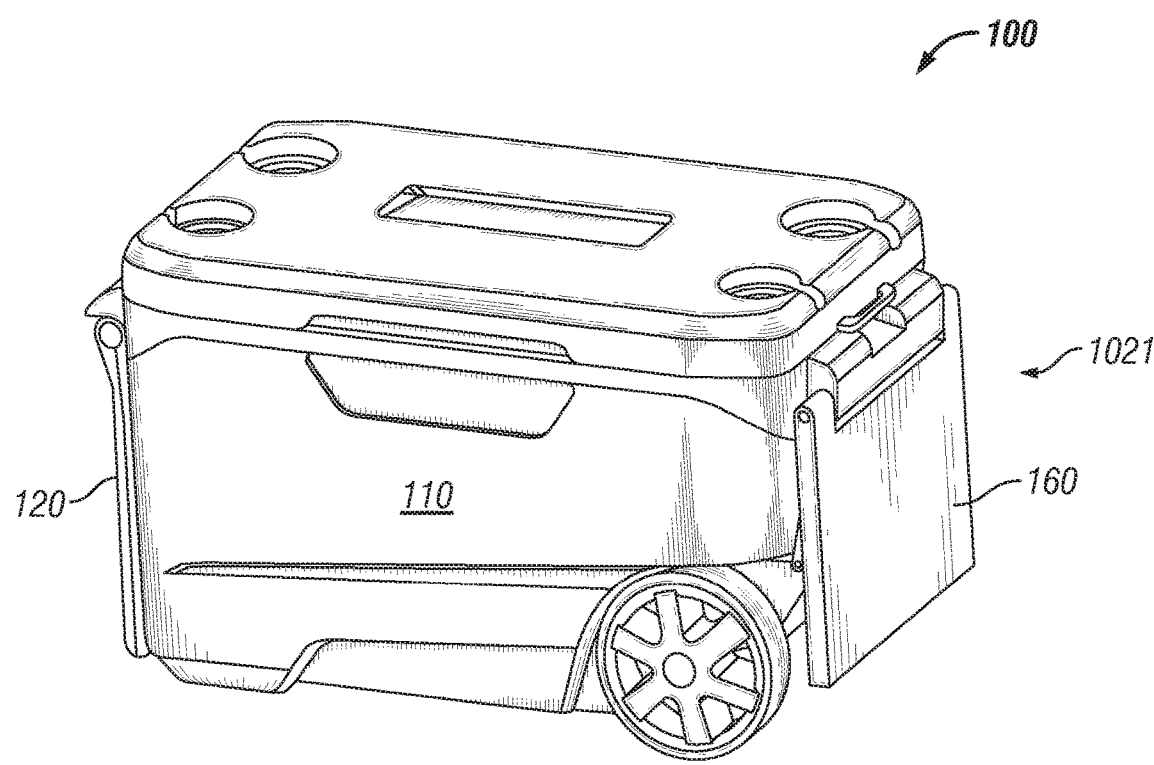
FIGS. 10A-10C include perspective views of the container of FIG. 1 with an additional extension portion and support stand.
Figure 10B:
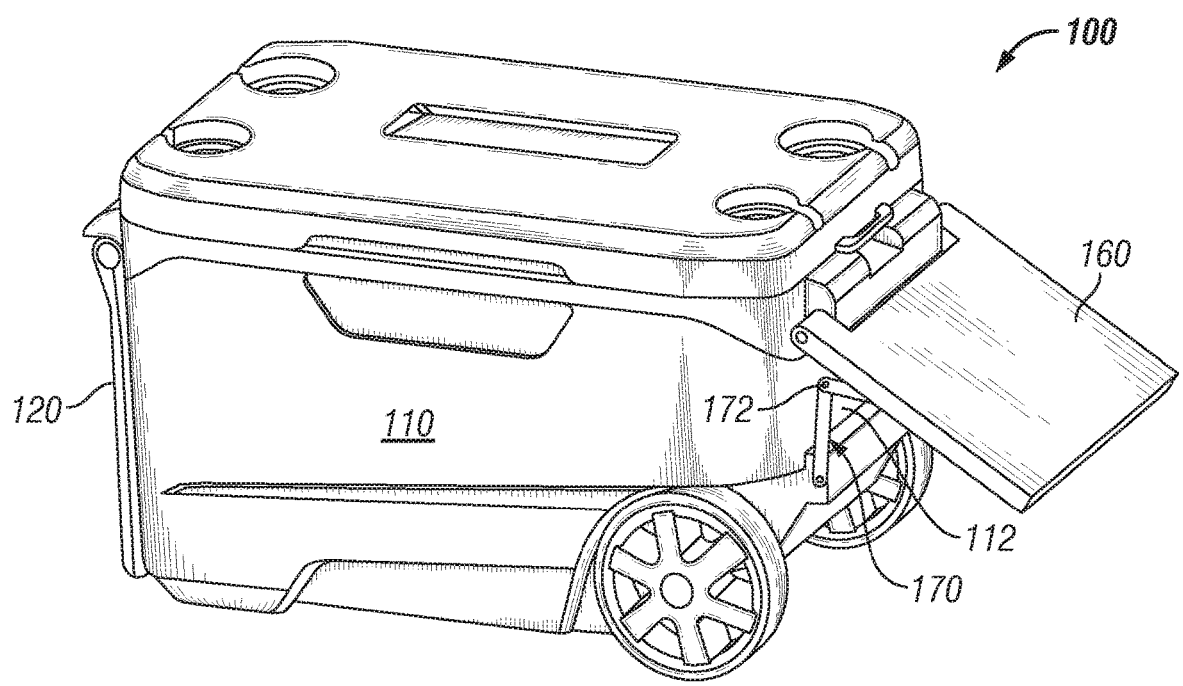
Figure 10C:
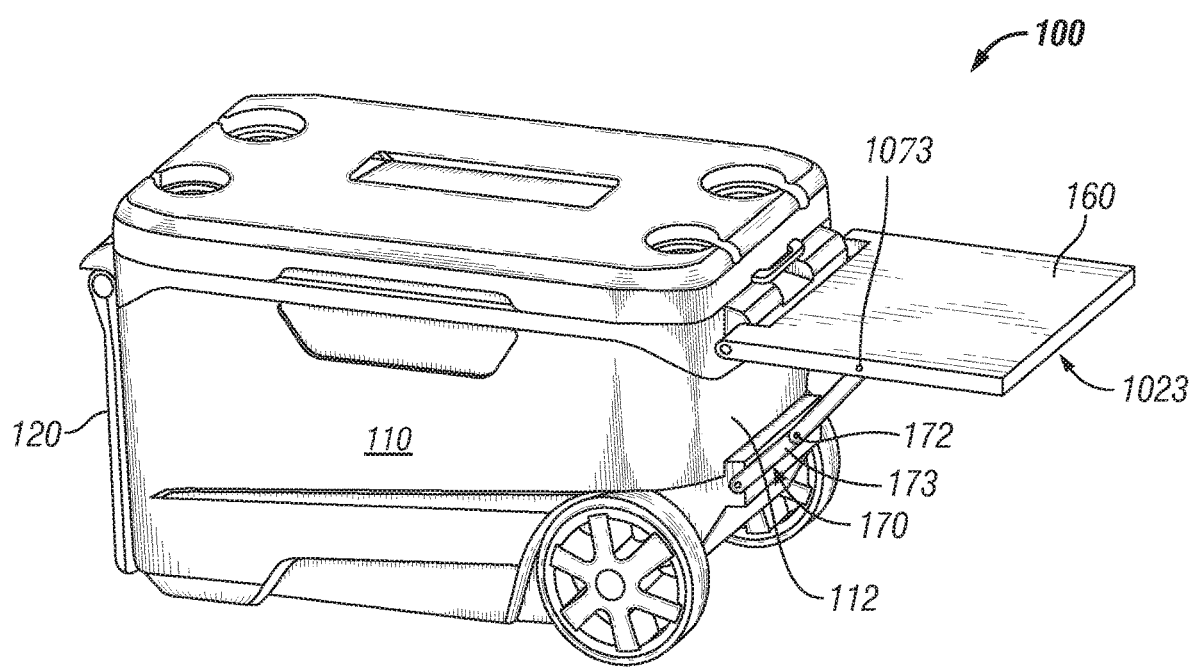

In some examples, the support stand 130 can be configured such that it is not connected to the extension portion 120 in the stowed position 131 (e.g., as shown in FIGS. 1A-1C). In other examples, the support stand 130 can be configured such that it is connected to the extension portion 120 in the stowed position 131 (e.g., as shown in FIGS. 10A-10C).

On the other hand, when the support stand 130 is in the support position 233, as shown in FIG. 2B, the support stand 130 can extend outwardly from the body wall 112, and a distal end of the support stand 130 can engage with an underside of the extension portion 120 such that the support stand 130 prevents downward rotation of the extension portion 120. When the distal end of the support stand 130 engages with the underside of the extension portion 120, an angle formed between the extension portion 120 and the body wall 112 can be approximately equal to 90 degrees, while an angle formed between the support stand 130 and the body wall 112 can be less than 90 degrees, as shown in FIG. 2B.

The angle formed between the support stand 130 and the body wall 112 can vary based on the position on the body wall 112 at which the support stand 130 is mounted in relation to the position of the extension portion 120. That is, as the distance between the proximal end of the support stand 130 and the proximal end of the extension portion 120 (where the extension portion 120 is coupled to the body wall 112) increases, the angle formed between the support stand 130 and the body wall 112 can decrease. As the distance between the proximal end of the support stand 130 and the proximal end of the extension portion 120 decreases, the angle formed between the support stand 130 and the body wall 112 can increase.

When the support stand 130 is in the support position 233, the support stand 130 can provide support for the extension portion 120 such that a downward force applied to the extension portion 120 (e.g., placing an object atop the extension portion 120, forcibly pressing down on the extension portion 120, etc.) is transferred through the support stand 130 to the body wall 112. Thus, the support stand 130 can prevent downward rotation of the extension portion 120, which can strengthen the positioning of the extension portion 120 and eliminate accidental collapse thereof.

Figure 3B:
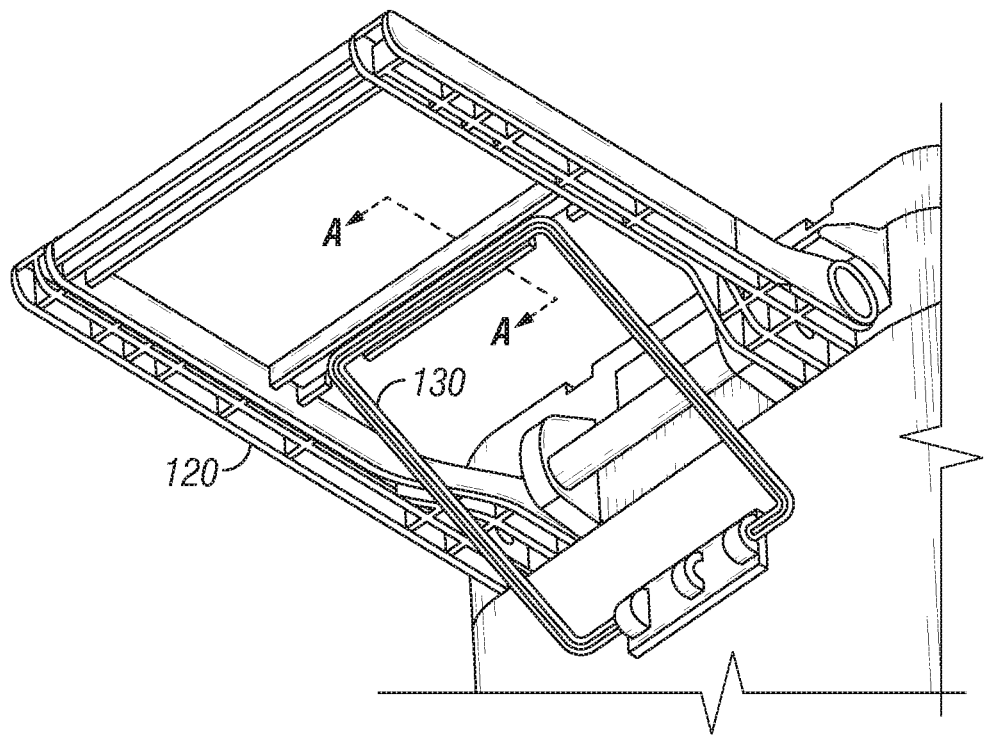
Figure 4:
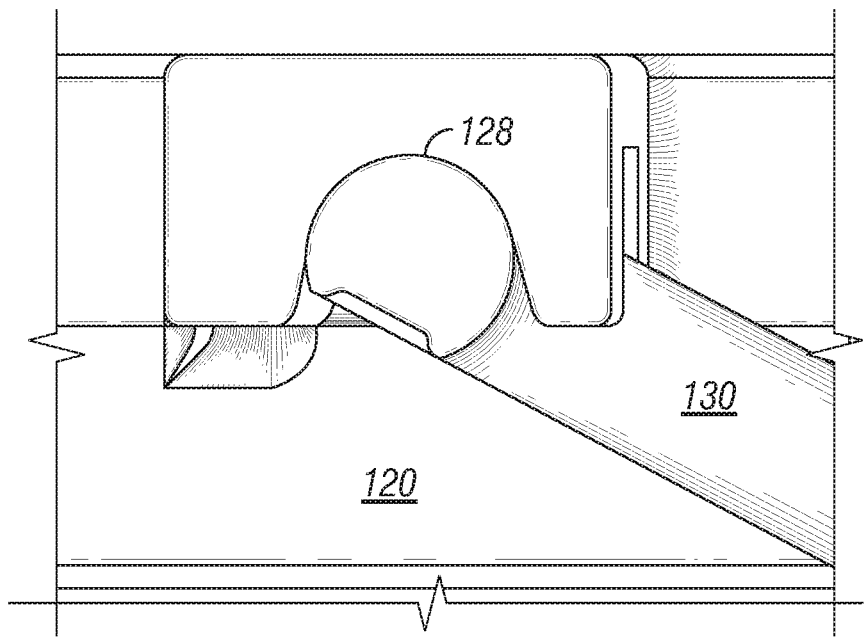
FIG. 4 is cross-sectional view of the support stand engaging with the extension portion taken along line A-A of FIG. 3B.

In further detail, FIGS. 3A and 3B include views of the support stand 130 engaging with the extension portion 120. FIG. 4 is cross-sectional view of the support stand 130 engaging with the extension portion 120 taken along line A-A of FIG. 3B. As shown in FIGS. 3A, 3B and 4, the distal end of the support stand 130 can engage with an underside of the extension portion 120 so as to prevent the downward rotation of the extension portion 120. The support stand 130 can include one or more outwardly extending arms 134 coupled to a distal member, e.g., transversely extending crossbar 136, configured to engage with the underside of the extension portion 120. Although the arms 134 of the support stand 130 are shown in FIGS. 3A and 3B as rigid, the arms 134 can be alternatively formed to include one or more hinging portions, as described in greater detail below (e.g., see FIGS. 10A-10C).

The extension portion 120 can include an indentation portion 128 formed on the underside of the extension portion 120. The indentation portion 128 of the extension portion 120 can be formed to receive and mate with the distal end 136 of the support stand 130 when the support stand 130 is in the support position 233. The indentation portion 128 can include a groove (or "pocket") substantially corresponding to the shape of the distal end 136 of the support stand 130 so as to prevent the support stand 130 from accidentally disengaging from the extension portion 120.

Figure 5A:
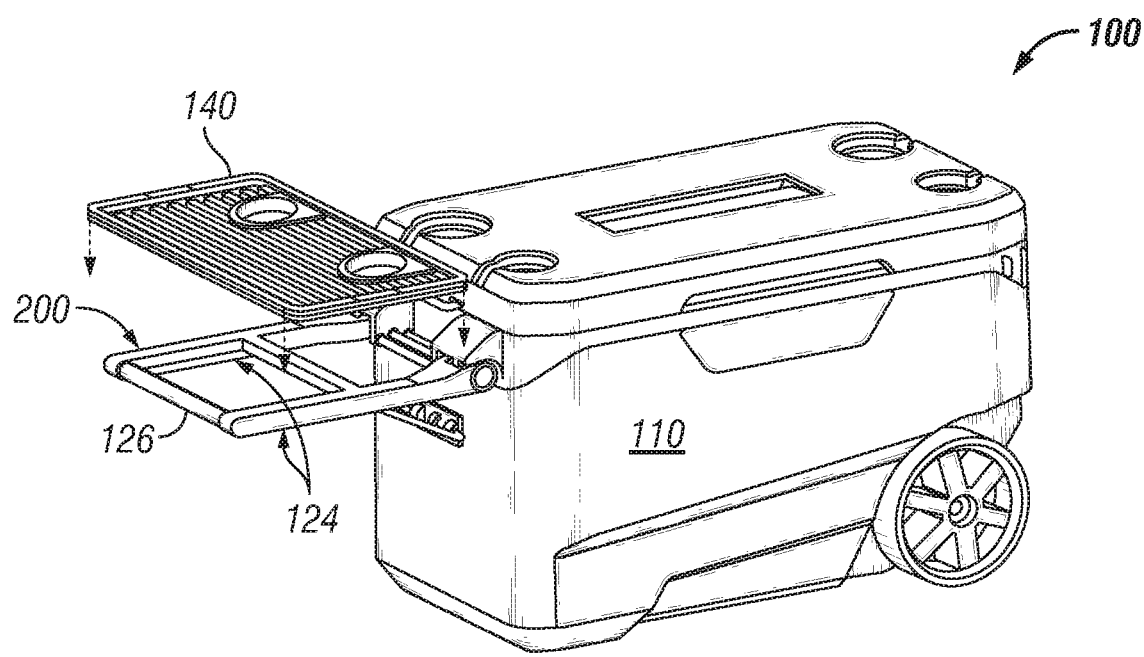
FIGS. 5A and 5B include views of the container of FIG. 1 having a tray placed on an external tray retention portion formed in the extension portion.

As noted above, the upper surfaces of the arms 124 and crossbar 126 can form an external tray retention portion 200 configured to removably retain a tray 140 (FIG. 5A). Thus, when the support stand 130 is in the support position 233 supporting the weight of the extension portion 120, such that the extension portion 120 is approximately perpendicular to the body wall 112, a tray 140 (FIG. 5A) can be securely placed on the external tray retention portion 200, allowing a user to use the tray 140 (FIG. 5A) for preparing meals, storing utensils, serving food and drinks, and so forth.

Figure 5B:
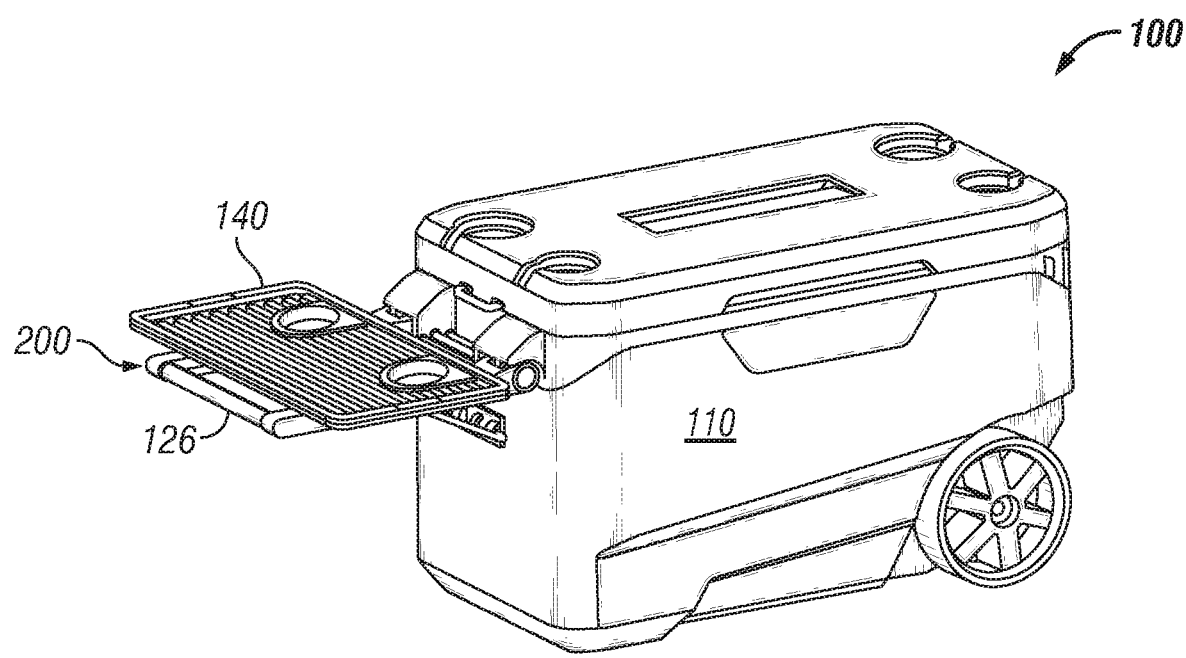

In this regard, FIGS. 5A and 5B include views of the container 100 with an external tray retention portion 200 formed in the extension portion 120. As shown in FIGS. 5A and 5B, a removable tray 140 can be placed onto and securely retained by the external tray retention portion 200. The external tray retention portion 200 can be formed by the upper surfaces of the arms 124 and crossbar 126 of the extension portion 120. Thus, when the support stand 130 is in the support position 233, and the external tray retention portion 200 retains the tray 140, as shown in FIGS. 5A and 5B, the support stand 130 can support the collective weight of the tray 140 and the extension portion 120.

The tray 140 can be configured in any suitable manner. For instance, the tray 140 can be formed to include any number or variety of features such as a substantially flat, elongate surface, one or more lateral ridges, one or more cup holders, raised walls, or any combination thereof. The dimensions of the tray 140 also can vary according to preferences of the designer.

The external tray retention portion 200 can mate with an underside of the tray 140 so as to prevent lateral movement of the tray 140 (i.e., movement in the x- or y-direction). As an example, the tray 140 can be formed with one or more features (not shown) on the underside of the tray 140 to snap into the walls of the arms 124 and crossbar 126 of the extension portion 120.

Figure 7:
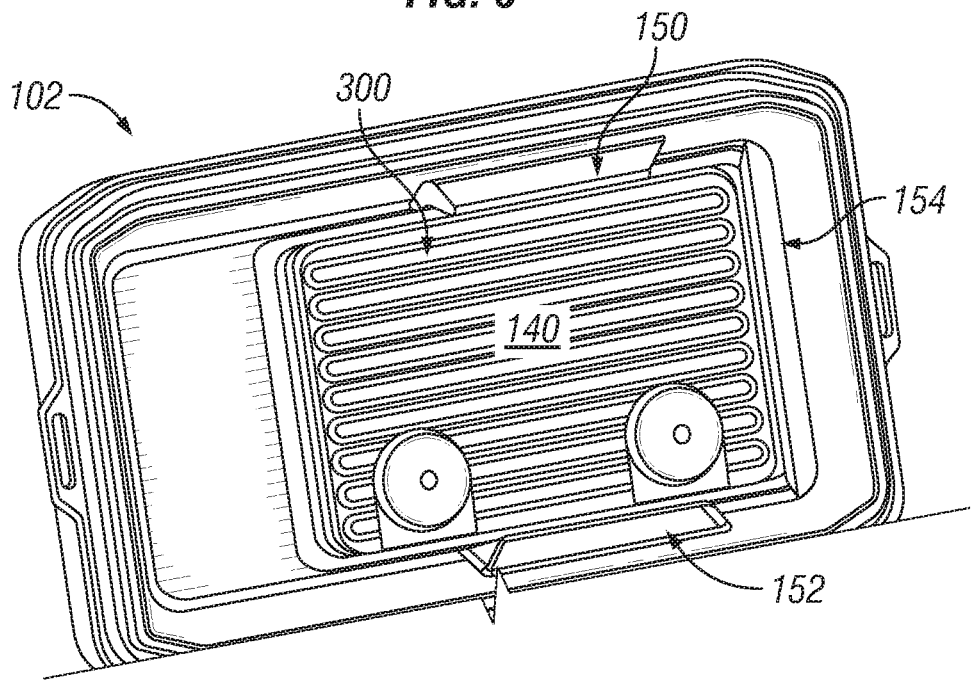
FIG. 7 is a close-up perspective view of the internal tray retention portion of FIG. 6.

In addition to, or instead of, the external tray retention portion 200, the container 100 can be formed to include an internal tray retention portion 300 (FIG. 6) to removably retain the tray 140. In this regard, FIG. 6 is a perspective view of the container 100 with an internal tray retention portion 300 formed in an underside of the lid 102, and FIG. 7 is a close-up perspective view of the internal tray retention portion 300. As shown in FIGS. 6 and 7, the internal tray retention portion 300 can include, at least, an elongate first rail 150 and an elongate second rail 152 respectively formed on opposite sides of a peripheral region of the underside of the lid 102. The rails 150, 152 can be formed in the lid 102 using a blow molding process, for example. Alternatively, the rails 150, 152 can be formed using an injection molding process.

Figure 9A:
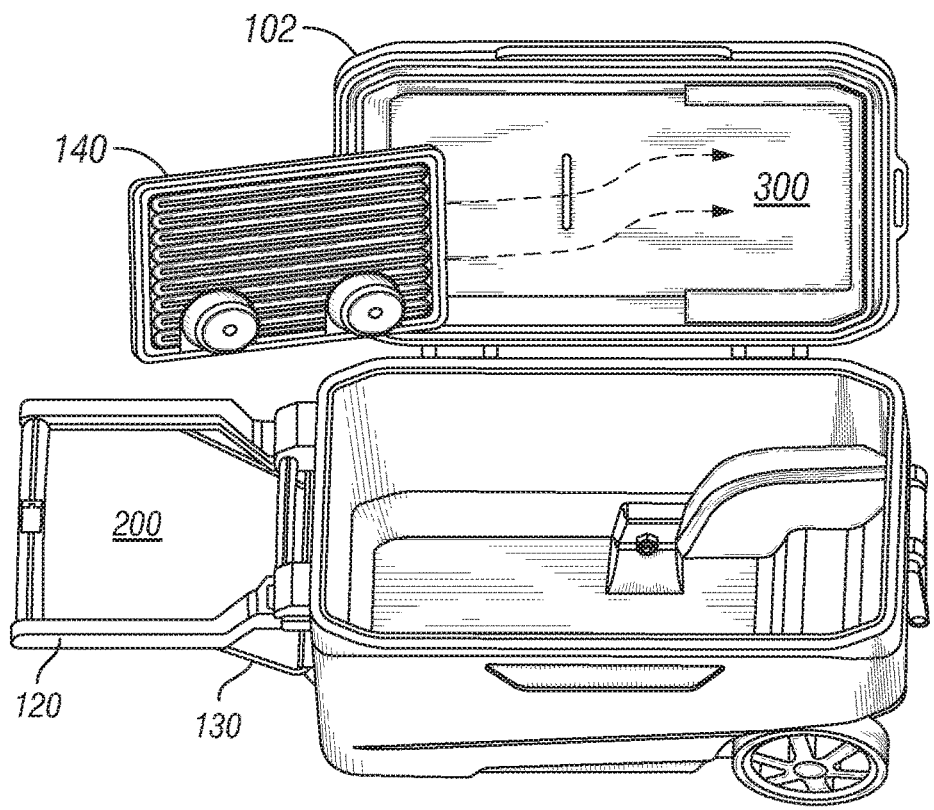
FIGS. 9A and 9B include perspective views of a tray being inserted into the internal tray retention portion of FIG. 6.
Figure 9B:
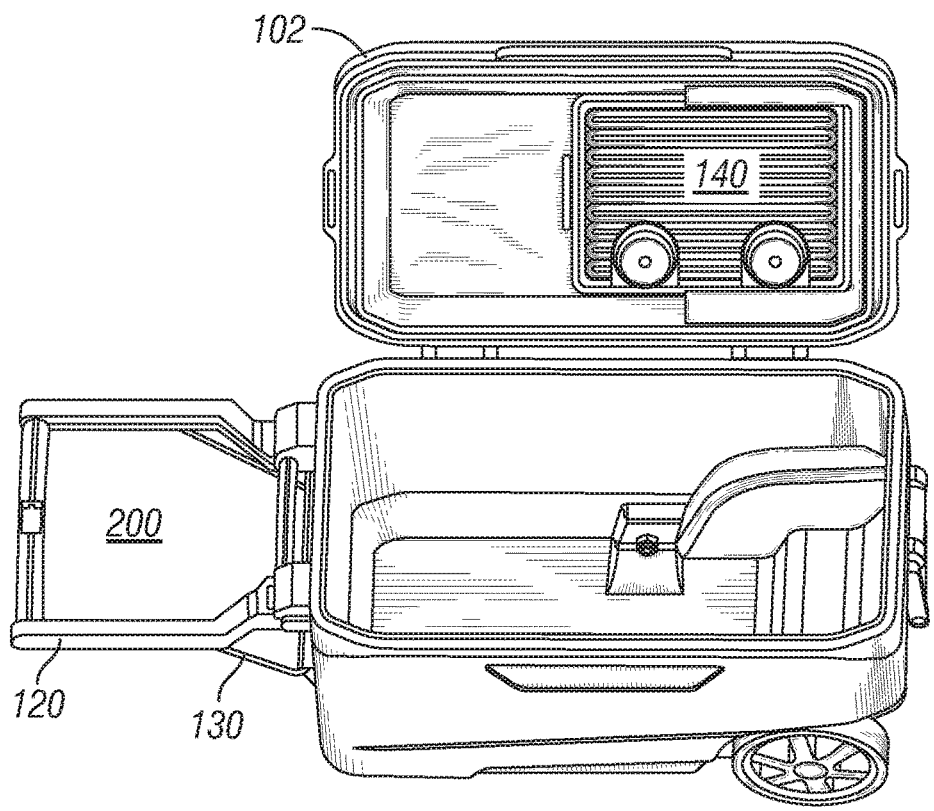

The first rail 150 and second rail 152 can be formed so as to receive and retain the tray 140 therein. The distance between the first rail 150 and the second rail 152 can correspond to about the width of the tray 140, for example. Each of the rails 150, 152 can protrude outwardly from inner peripheral walls of the lid 102 such that the tray 140 can be slid under the rails 150, 152 (i.e., between the rails 150, 152 and the underside of the lid 102) in the distal direction, as shown in FIGS. 9A and 9B. With the first and second rails 150 and 152, at least two sides of the tray 140 can be secured under the rails 150, 152.

The internal tray retention portion 300 can also include an elongate third rail 154 formed on the peripheral region of the underside of the lid 102 perpendicular to the first rail 150 and the second rail 152. Like the first rail 150 and the second rail 152, the third rail 154 can protrude outwardly from an inner peripheral wall of the lid 102 such that the tray 140 can be slid under the third rail 154. With the first, second, and third rails 150, 152 and 154, at least three sides of the tray 140 can be secured under the rails 150, 152, 154.

Figure 8A:
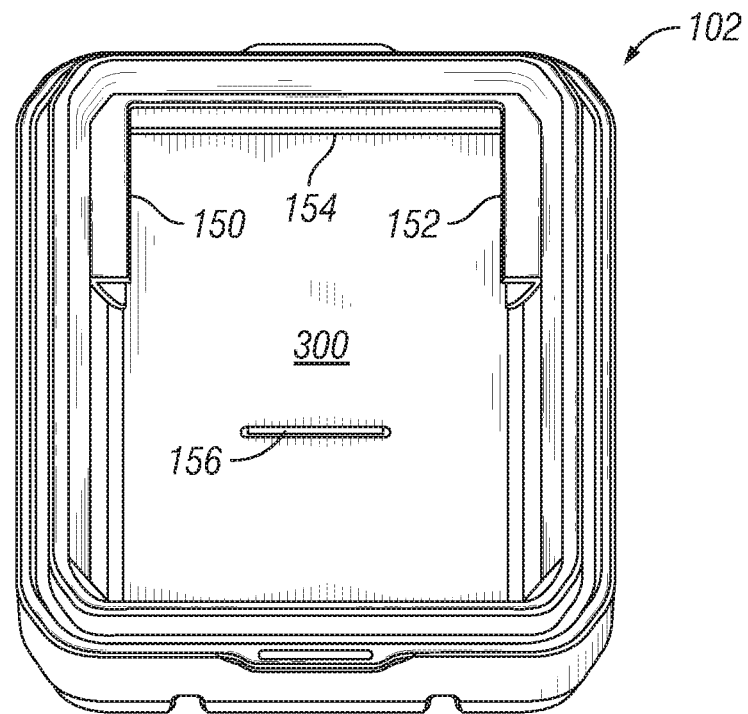
FIGS. 8A and 8B include isolated perspective views of the lid and the internal tray retention portion of FIG. 6.
Figure 8B:
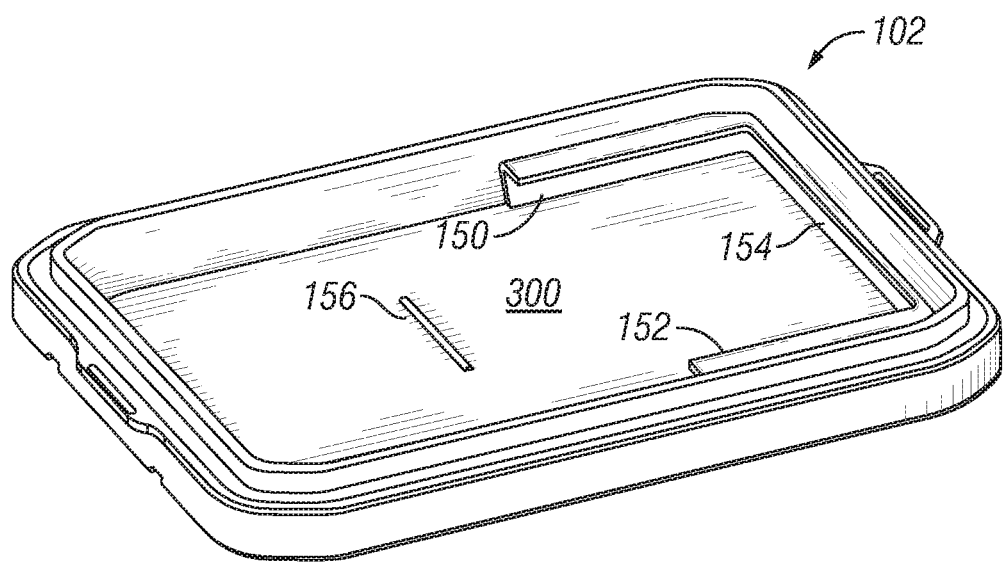

Furthermore, the internal tray retention portion 300 can also include an elongate protrusion portion 156 formed in the lid 102 acting as a "hard stop" to prevent accidental release of the tray 140. In this regard, FIGS. 8A and 8B include isolated views of the lid 102 and the internal tray retention portion 300. As shown in FIGS. 8A and 8B, the protrusion portion 156 can be formed inside of the peripheral region of the underside of the lid 102. The protrusion portion 156 can be disposed perpendicular to the first rail 150 and the second rail 152 and parallel to the third rail 154. The protrusion portion 156 can protrude from the inner surface of the lid 102 so as to abut a side of the tray 140 while the tray 140 is inserted in the internal tray retention portion 300. In this manner, the protrusion portion 156 can prevent the tray 140 from sliding in the proximal direction and accidentally exiting the internal tray retention portion 300. To release the tray 140 from the internal tray retention portion 300, a user can manually lift the tray 140 over the protrusion portion 156 and pull out the tray 140 in the proximal direction.

The internal tray retention portion 300 can be configured such that a shape formed by the first rail 150, the second rail 152, the third rail 154, and the protrusion portion 156 substantially corresponds to a shape of the tray 140. In some configurations, the first rail 150, the second rail 152, and the third rail 154 can be physically separate from each other, as shown in FIGS. 6 and 7. In other configurations, the first rail 150 and the second rail 152 can be connected via the third rail 154, as shown in FIGS. 8A and 8B.

FIGS. 9A and 9B include views of the tray 140 being inserted into the internal tray retention portion 300. As shown in FIGS. 9A and 9B, the tray 140 can be slid in a distal direction (i.e., insertion direction) along the inner surface of the lid 102 under the first rail 150 and the second rail 152 until the distal end of the tray 140 is at least partially covered by the third rail 154. If the internal tray retention portion 300 does not include the third rail 154, the distal end of the tray 140 can abut the distal inner wall of the lid 102. Here, the proximal end of the tray 140 can abut the protrusion portion 156 (if the internal tray retention portion 300 includes the protrusion portion 156), thus preventing the tray 140 from sliding in the proximal direction (i.e., exit direction) and accidentally falling out of the internal tray retention portion 300. Therefore, the tray 140 can be stored inside the container 100 against the lid 102, allowing for convenient storage and transportation of the tray 140.

FIGS. 10A-10C include views of the container 100 with an additional extension portion 160 and support stand 170. As shown in FIGS. 10A-10C, the container 100 can additionally, or alternatively, include a tray-like extension portion 160 having a substantially flat, elongate surface. The extension portion 160 can be rotatably coupled to an outward-facing surface of a body wall 112 of the body 110. In one example, the extension portion 160 can be disposed at an opposite side of the container 100 as the extension portion 120, as shown in FIGS. 10A-10C.

Like the extension portion 120, the extension portion 160 can be connected to the body wall 112, via a rotating connection such as one or more pins, hinges, joints, pivots, etc., and can rotate between, at least, an inactive position 1021 in which the extension portion 160 is positioned against or proximate to the outward-facing surface of the body wall 112 and an active position 1023 in which the extension portion 160 extends outwardly from the body wall 112. In the inactive position 1021, as shown in FIG. 10A, whereby the extension portion 160 is stowed away, an angle formed between the extension portion 160 and the body wall 112 can be approximately 0 degrees, that is, parallel to the body wall 112. In the active position 1023, as shown in FIG. 10C, whereby the extension portion 160 rotates upwardly from the body wall 112 for use, the angle formed between the extension portion 160 and the body wall 112 can be any angle greater than 0 degrees, and generally about 90 degrees. The active position 1023 can allow a user to utilize the extension portion 160 as an external tray for preparing food, storing utensils, and the like.

Also, the container 100 can additionally, or alternatively, include a hinging support stand 170 disposed on the body wall 112 below the extension portion 160. The support stand 170 can connect to body wall 112 so as to pivot upwardly or downwardly into a desired position. The proximal end of the support stand 170 can be connected to the outward-facing surface of the body wall 112, via a pivoting connection such as one or more pins, hinges, joints, pivots, etc., and can permit the support stand 170 to pivot between, at least, a stowed position (not shown) in which the support stand 170 is positioned against or proximate to the outward-facing surface of the body wall 112 and a support position 173 in which the support stand 170 extends outwardly from the body wall 112.

When the support stand 170 is not in use, it can be moved to the stowed position, as shown in FIG. 10A, whereby the support stand 170 can be positioned against or proximate to the outward-facing surface of the body wall 112. Here, the support stand 170 can be placed substantially flat against the body wall 112. Similarly, the extension portion 160 can be positioned against or proximate to the outward-facing surface of the body wall 112 when not in use (i.e., inactive position 1021).

When both of the extension portion 160 and the support stand 170 are stowed against the body wall 112, the extension portion 160 and the support stand 170 can be substantially parallel to one another, as shown in FIG. 10A. Also, in such positions, the extension portion 160 can at least partially conceal the support stand 170 by virtue of the extension portion 160 being disposed above the support stand 170, though the extension portion 160 need not necessarily conceal the support stand 170.

On the other hand, when the support stand 170 is in the support position 173, as shown in FIG. 10C, the support stand 170 can extend outwardly from the body wall 112, and a distal end of the support stand 170 can engage with an underside of the extension portion 160 such that the support stand 170 prevents downward rotation of the extension portion 160. In this position, an angle formed between the extension portion 160 and the body wall 112 can be approximately equal to 90 degrees, while an angle formed between the support stand 170 and the body wall 112 can be less than 90 degrees.

Unlike the rotatable support stand 130, the support stand 170 can include at least one hinging portion 172 configured to fully hinge when the support stand 170 is in the stowed position (e.g., see FIG. 10A) and fully extend when the support stand 170 is in the support position (e.g., see FIG. 10C). Moreover, the distal end of the support stand 170 can be connected to (e.g., bolted 1073) the underside of the extension portion 160. Thus, the support stand 170 and the extension portion 160 can be connected to each other, even in the stowed/inactive positions, and the support stand 170 automatically moves in conjunction with the extension portion 160, rather than independently of each other in the case of the support stand stand 130 (FIG. 1A) and extension portion 120 (FIG. 1A).

It should be understood that the configurations of extension portions and support stands described above can be combined or arranged in any suitable manner as would be understood by a person possessing an ordinary level of skill in the art. For example, the handle-like extension portion 120 can be disposed on the container body 110 so as to engage with the hinging support stand 170, and/or the tray-like extension portion 160 can be disposed on the container body 110 so as to engage with the rotating support stand 130.

Accordingly, the container described herein can include internal and/or external tray retention portions for securely receiving and retaining a removable tray on which a user can prepare meals, store utensils, serve food or drinks, and the like. The container can further include a stowable support stand for supporting the weight of an extension portion. As a result, a user can easily and securely transport and deploy a tray for picnics or other outings in which a container is used for storing food, beverages, etc.

The foregoing description has been directed to certain embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A container comprising:
   a substantially hollow body including a plurality of body walls extending vertically from a bottom portion;
   an extension portion rotatably coupled to an outward-facing surface of a body wall among the plurality of body walls, the extension portion configured to rotate to an active position in which the extension portion extends outwardly from the body wall;

a support stand having a proximal end coupled to the outward-facing surface of the body wall and a distal end, and wherein when the extension portion has been positioned in the active position, the support stand is configured to move between at least a stowed position in which the support stand is positioned entirely against or proximate to the outward-facing surface of the body wall and a support position in which the support stand extends outwardly from the body wall;

a lid rotatably coupled to an upper portion of a body wall among the plurality of body walls, the lid configured to reversibly close an opening of the body formed by the plurality of body walls;

a tray having a substantially flat, elongate surface; and an internal tray retention portion formed in an underside of the lid configured to removably retain the tray, the internal tray retention portion including at least a first rail and a second rail respectively formed on opposite sides of a peripheral region of the underside of the lid, the first rail and the second rail formed so as to receive and retain the tray therein, wherein, when the support stand is in the support position, the distal end of the support stand has been manually rotated to engage with an underside of the extension portion such that the support stand prevents downward rotation of the extension portion.

2. The container of claim 1, wherein the extension portion is further configured to rotate between at least the active position and an inactive position in which the extension portion is positioned against or proximate to the outward-facing surface of the body wall.

3. The container of claim 1, wherein, when the support stand is in the support position, such that the distal end of the support stand engages with the underside of the extension portion, an angle formed between the extension portion and the body wall is approximately equal to 90 degrees, and an angle formed between the support stand and the body wall is less than 90 degrees.

4. The container of claim 1, wherein the extension portion is a handle including a pair of outwardly extending arms connected via a transversely extending crossbar.

5. The container of claim 4, wherein:

upper surfaces of the arms and crossbar form an external tray retention portion configured to removably retain the tray, and when the support stand is in the support position and the external tray retention portion retains the tray, the support stand provides support for the tray and the extension portion.

6. The container of claim 5, wherein the external tray retention portion mates with an underside of the tray so as to prevent lateral movement of the tray.

7. The container of claim 1, wherein, when the support stand is in the support position, the support stand provides support for the extension portion such that a downward force applied to the extension portion is transferred through the support stand to the body wall.

8. The container of claim 1, wherein the proximal end of the support stand is rotatably coupled to the body wall, the support stand configured to rotate between at least the stowed position and the support position.

9. The container of claim 1, further comprising an indentation portion formed on the underside of the extension portion, the indentation portion configured to mate with the distal end of the support stand when the support stand is in the support position.

10. The container of claim 1, wherein the distal end of the support stand includes a transversely extending crossbar configured to engage with the underside of the extension portion.

11. The container of claim 1, wherein, when the support stand is in the stowed position, the support stand and the extension portion are unattached to each other.

12. The container of claim 1, wherein the distal end of the support stand is bolted to the underside of the extension portion.

13. The container of claim 1, wherein the support stand includes a hinging portion configured to fully hinge when the support stand is in the stowed position and fully extend when the support stand is in the support position.

14. The container of claim 1, wherein, when the support stand is in the stowed position and the extension portion is in an inactive position in which the extension portion is positioned against or proximate to the surface of the body wall, the extension portion at least partially conceals the support stand.

15. The container of claim 1, wherein the extension portion is comprises a second tray having a substantially flat, elongate surface.

* * * * *